May 5, 1964  G. WILKE ETAL  3,132,155
CARBOXYLIC ACID ANHYDRIDES, CARBOXYLIC ACIDS AND
CARBOXYLIC ACID ESTERS OF THE CYCLODODECANE
SERIES, AND A PROCESS FOR THEIR PRODUCTION
Filed Dec. 17, 1958
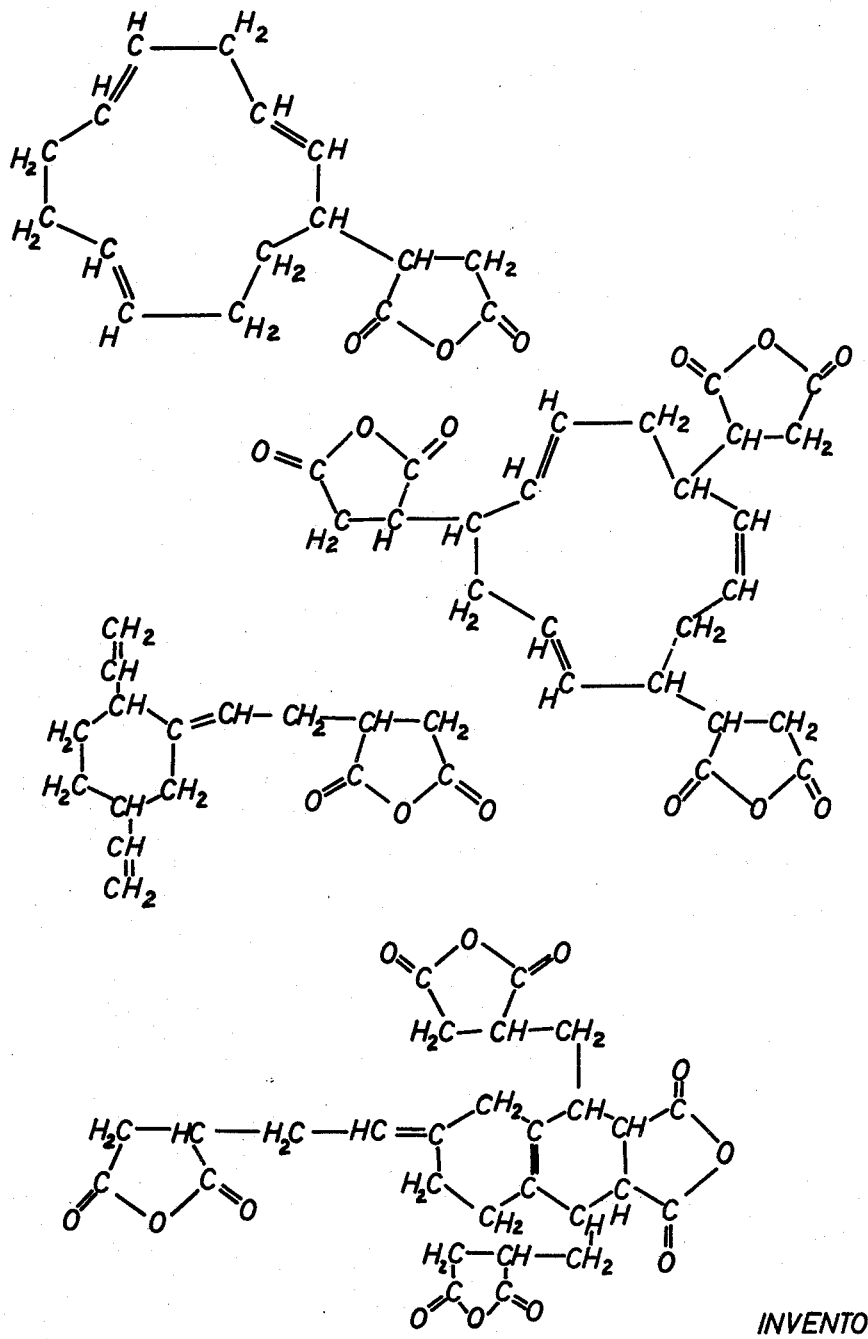
INVENTORS:
GÜNTHER WILKE & WERNER PFOHL
BY
Burger, Dinklage & Sprung
ATTORNEYS United States Patent Office 3,132,155
Patented May 5, 1964

3,132,155
CARBOXYLIC ACID ANHYDRIDES, CARBOXYLIC ACIDS AND CARBOXYLIC ACID ESTERS OF THE CYCLODODECANE SERIES, AND A PROCESS FOR THEIR PRODUCTION
Günther Wilke, Mulheim (Ruhr), and Werner Pfohl, Hamburg, Germany, assignors to Studiengesellschaft Kohle m.b.H., Mulheim (Ruhr), Germany, a body corporate of Germany
Filed Dec. 17, 1958, Ser. No. 780,921
Claims priority, application Germany Dec. 23, 1957
11 Claims. (Cl. 260—346.3)

This invention relates to carboxylic acid anhydrides, carboxylic acids and carboxylic acid esters of the cyclododecane series, and a process for their production.

Belgian patent specification Nos. 555,180 and 564,175 disclose processes for the production of cyclododecatri-(1,5,9)-enes and also other cyclic hydrocarbons having at least 8 carbon atoms and at least two double bonds in the ring, by the reaction of butadi-(1,3)-ene or its monomethyl substitution products with catalysts. Cyclododecatri-(1,5,9)-enes can also be transposed to trivinyl cyclohexanes. Because of the three double bonds in the molecule, cyclododecatrienes and also trivinyl cyclohexanes constitute reactive compounds which can be used for many additional conversions to provide valuable products.

According to the present invention, carboxylic acid anhydrides, carboxylic acids and/or their esters may be obtained by the addition of 1 molecule of a cyclododecatri-(1,5,9)-ene or a trivinyl cyclohexane to 1-4 molecules of maleic acid anhydride. The reaction products obtained in the first stage of the process according to the invention are anhydrides of dicarboxylic or higher polycarboxylic acids. The structure thereof is still not known with certainty, but in the products of the process according to the invention dicarboxylic or higher polycarboxylic acid anhydrides or formulae as shown in the accompanying drawings must be present, possibly in admixture with one another.

The anhydrides obtained can be converted by saponification into carboxylic acids or by esterification into carboxylic acid esters. The properties of the products depend to a great extent on the number of the acid groups present, which can be varied from 2 to 6 or 8, and on the constitution of the alcohols used for esterification purposes. Thus for example, according to the process of the invention, derivatives of cyclododecatri-(1,5,9)-ene with three succinic acid anhydride groups on the ring can be obtained in a practically quantitative yield, which derivatives can be transformed by saponification into hexacarboxylic acids or by esterification into hexaesters.

Whilst it is true that it is known per se to add olefines to maleic acid anhydride, it was nevertheless not to be anticipated that the triolefines to be used with maleic acid anhydride, according to the invention would yield anhydrides or dicarboxylic, tetracarboxylic, hexacarboxylic and even octacarboxylic acids by assemblage. This was not to be anticipated, because it has already been established that under the influence of various reagents, and more especially of acidly acting substances, cyclododecatri-(1,5,9)-enes are isomerized with the disappearance of the double bonds and also because, as has already been found, trivinyl cyclohexane is unstable under similar conditions.

The reaction products contain novel atom groupings, from which novel and valuable possibilities of use stem. It is especially important and advantageous that the properties of the products which can be produced by the process of the invention can be varied in many different ways by suitable choice of the reaction conditions and the proportions of the reagents. The products with for example 1 molecule of maleic acid anhydride contain the two originally present double bonds in addition to the double bond adjacent the acid anhydride grouping, no variation in the reactivity having occurred in the vicinity of the said double bonds originally present due to the occurrence of a succinic acid anhydride radical. The addition products with more than 1 molecule of maleic acid anhydride, and more especially those with 3 molecules of maleic acid anhydride, have an interesting spider-like structure and, on esterification, give polycarboxylic acid esters which have very valuable properties as plasticisers. The hexacarboxylic acids which may be obtained from the hexacarboxylic acid anhydrides by boiling with water are soluble in water. This is a remarkable property for acids of such high molecular weight.

In carrying out the process of the invention, temperatures of from 150 to 250° C., and advantageously of from 150 to 200° C., are employed. The reaction can be effected simply by heating the undiluted reactants, but the components are preferably diluted with a solvent in order to keep the viscosity of the mixture low, especially towards the end of the reaction. Suitable solvents are all those which are inert with respect to maleic acid anhydride, and more especially aromatic hydrocarbons such as benzene, toluene, and xylene, since the products which are formed then remain in solution. When adding a solvent, it is necessary to work in an autoclave.

The course of the reaction according to the invention can be controlled by various measures. For example, 1:1-addition products are advantageously obtained by using an excess of triolefine, and 1:3-addition products are obtained with an excess of maleic acid anhydride, for example, in order to produce the treble addition product of cyclododecatri-(1,5,9)-ene, a molar ratio between triolefine and anhydride such as 1:6 to 1:7 is used, and on the other hand, in order to obtain the 1:1-addition product of trivinyl cyclohexane, for example, a molar ratio between triolefine and anhydride such as 2:1 is used.

However, different reaction products can be obtained by varying the reaction time. In this case, it is expedient to use the maleic acid anhydride in excess and to take samples from the reaction mixture at intervals, from which samples the maleic acid anhydride and any olefine still unreacted are distilled off, whereupon the saponification number of the residue which remains is determined. The table in Example 1 shows how the composition of the reaction product depends on the reaction time.

As has already been stated above, all products obtained by the process still contain double bonds as well as the acid anhydride groupings. This can be particularly advantageous if the products produced according to the process of the invention are reacted with other suitable substances, for example for the purpose of manufacturing synthetic resins, because in that event additional opportunities for varying the properties of the synthetic resin arise from the presence of the double bonds. The double bonds can of course also be hydrogenated, and in this case saturated dicarboxylic or higher polycarboxylic acid anhydrides are obtained, and there may be hydrolyzed to the corresponding dicarboxylic or higher polycarboxylic acids, which anhydrides and acids are distinguished by a particularly high resistance to secondary modifications, such as oxidation, because of the absence of the double bonds.

The following examples further illustrate the invention:

EXAMPLE 1

363 g. of maleic acid anhydride and 106 g. of cyclododeca-tri-(1,5,9)-ene (molar ratio 5.65:1) in 600 g. of benzene are heated in a 2-litre V2A-autoclave equipped with magnetic stirring means and heating means. Samples are removed after certain time intervals. The heating period, temperature and analysis of the intermediate products are shown in the following table. Analysis of the samples is so carried out that maleic acid anhydride, benzene and olefine are distilled off in vacuo and the saponification number of the residue is determined.

Table

| Sample | Reaction period at the temperature indicated | Temperature, °C | Saponification number |
| --- | --- | --- | --- |
| 1 | 30 hours | 170 | 510 |
| 2 | 3 days | 180 | 603 |
| 3 | 3 days | 180 | 669 |
| 4 | 4 days | 180 | 720 |

Sample 4 corresponds, both as regards the saponification number of 720 (theoretical 737) and oxygen content of 31.52% (theoretical 31.56% O), to a 1:3-addition product cyclododeca-tri-(1,5,9)-ene-maleic acid anhydride.

With increasing reaction times, the colouring of the samples becomes somewhat more intensive. Sample 1 has a light yellow colour, while sample 4 is brown in colour. Samples 1 to 4 are soluble in alcohol. Sample 4, after saponification, is also completely soluble in cold and hot water. The yield of 1:3-addition product is practically quantitative.

EXAMPLE 2

135 g. of maleic acid anhydride and 30 g. of cyclododeca-tri-(1,5,9)-ene (molar ratio 7.7:1) in 110 g. of benzene are heated for 14 hours at 195 to 200° C. in a 500 cc. V2A-autoclave. The mixture is then cooled to below the boiling temperature of benzene and the brown reaction medium is removed and placed in a distillation flask. The benzene is distilled off at normal pressure and the excess maleic acid anhydride in vacuo. The last traces of maleic acid anhydride are distilled off under high vacuum. 82.5 g. of a brown brittle product which is viscous at 110° C. and resinous at room temperature are obtained. The yield is 97% of the theoretical. The saponification number is 712 (theoretical 737). The end product has the following composition: C=63.30% (theoretical 63.15%), H=5.35% (theoretical 5.3%), O=31.42% (theoretical 31.56%).

The triple succinic acid anhydride addition product is saponified conventionally, for example with water or aqueous alkali, and the saponification solution is in the latter event freed from alkali metal ions by an acid ion exchanger. In this way, a clear aqueous solution of hexacarboxylic acid is obtained.

The ethyl ester is prepared in the following manner: 10 g. of the product with 45 cc. of ethanol and 45 cc. of benzene, and with the addition of 0.7 g. of p-toluene sulphonic acid, are heated for 3 days to boiling point under a fractionating column; the water formed is removed by azeotropic distillation. The mixture obtained by esterification is taken up in ether to remove the acid and is washed with water. After drying the ether solution and distilling off the solvent, a viscous brown residue is left; it has an ethoxyl content of 37.7% (theoretical for the hexaester is 39.93%).

EXAMPLE 3

280 g. of maleic acid anhydride and 100 g. of cyclododeca-tri-(1,5,9)-ene (molar ratio 4.63:1) in 500 g. of benzene are heated in a 2-litre V2A-autoclave for 15 hours at 160° C. and for 35 hours at 170° C. After cooling the autoclave, a clear slightly yellowish solution is discharged. The benzene, and excess maleic acid anhydride and cyclododecatri-(1,5,9)-ene are distilled off and the residue distilled under high vacuum. At a boiling temperature of 120 to 130° C., 21 g. of a highly viscous colourless substance are obtained. 3 g. of a brownish-yellow, resinous, brittle product are left as undistillable residue. The yield of the 1:1-addition product is 87.5%. The elementary analysis and the saponification number correspond to those of the 1:1-addition product.

Catalytic hydrogenation in the presence of Raney nickel, whereby a saturated dicarboxylic acid anhydride is formed, reveals the presence of three double bonds per molecule.

The benzene and the mixture of maleic acid anhydride and cyclododecatriene distilled off from the solution discharged from the autoclave as described above, are again introduced into the reaction and, under the same conditions as described above, further 1:1-addition product is obtained.

EXAMPLE 4

12 g. of maleic acid anhydride and 32 g. of trivinyl cyclohexane in 50 g. of benzene (molar ratio 1:1.6) are heated in a 200 cc. V2A-autoclave for 18 hours at 152 to 156° C. A clear yellowish solution is obtained. After removing the benzene and the excess maleic acid anhydride and olefine, 16.5 g. of a yellow residue are isolated from this solution, from which residue a clear slightly yellowish viscous liquid can be distilled off under high vacuum. Its elementary analysis and saponification number conform to those of the 1:1-addition product. The yield of the 1:1-addition product is 91%.

EXAMPLE 5

130 g. of maleic acid anhydride and 31 g. of trivinyl cyclohexane (molar ratio 7:1) in 130 g. of benzene are heated in a 500 cc. V2A-autoclave for 30 hours at 150 to 155° C. and for a further 8 hours at 155 to 160° C. A clear solution is obtained, in which a solid yellow substance is suspended. On working up, 80 g. of a yellow brittle resinous product are obtained, the saponification number of which is 830 (theoretical, 809.5) and the oxygen value of which is 34.95% (theoretical, 34.62%), corresponding to a 4:1-addition product of maleic acid anhydride with trivinyl cyclohexane. The substance can readily be hydrolyzed and the hydrolysis product is completely soluble in water.

EXAMPLE 6

The procedure of Example 2 is followed, but toluene or xylene is used as the solvent instead of benzene. After the reaction with maleic acid anhydride and the removal of the solvent, the triple addition product of maleic acid anhydride with cyclododecatri-(1,5,9)-ene is obtained in the yield indicated in Example 2.

EXAMPLE 7

The esterification of the triple addition product of maleic acid anhydride with cyclododecatri-(1,5,9)-ene is carried out as follows:

10 g. of the addition product are heated in twice the stoichiometric quantity of the corresponding alcohol in the presence of 0.5 g. of p-toluene sulphonic acid for 2 to 3 days at 150° C. The water which is formed during the reaction is preferably removed continuously from the reaction mixture by azeotropic distillation, that is to say it is taken off at a phase separation head. Using tetradecanol as the alcohol, such a quantity of toluene was added to the reaction mixture that the temperature was maintained at 150° C. with strong reflux. The reaction is completed when no more water is separated out in the phase separation head. The reaction mixture is then washed with water and caustic soda solution in order to remove the acid added from esterification purposes. The dried solution is freed by distillation from solvent and excess alcohol. The desired ester is obtained as the residue.

By using hexan-1-ol as the alcohol, the hexahexyl ester of the 3:1-addition product was obtained, saponification number 293.

By using tetradecan-1-ol as the alcohol, the hexatetradecyl ester was obtained, saponification number 169.

By using butan-1-ol as the alcohol, the hexabutylester was obtained, saponification number 356.

What we claim is:

1. A process comprising reacting at an elevated temperature from 1-4 molecules of maleic acid anhydride with one molecule of a triolefine which is a member selected from the group consisting of cyclododeca-tri-(1,5,9)-ene and trivinyl cyclohexane and recovering the reaction product thereby formed.

2. Process according to claim 1 which comprises effecting said reaction at a temperature of between 150 and 250° C.

3. Process according to claim 2 which comprises effecting said reaction at a temperature of between 150 and 200° C.

4. Process according to claim 1 which comprises effecting said reaction in the presence of a solvent which is inert with respect to maleic acid anhydride.

5. Process according to claim 4 wherein said solvent is an aromatic hydrocarbon.

6. Process according to claim 5 wherein said aromatic hydrocarbon is a member selected from the group consisting of benzene, toluene and xylene.

7. Process according to claim 1 which comprises employing an excess of said triolefine with respect to said maleic acid anhydride and wherein said reaction product formed is a product in which one molecule of maleic acid anhydride has been added to one molecule of triolefine.

8. Process according to claim 1 which comprises employing an excess of said maleic acid anhydride with respect to said triolefine and where said reaction product formed is a product in which three molecules of maleic acid anhydride have been added to one molecule of triolefine.

9. Process according to claim 1 which comprises hydrolizing the carboxylic acid anhydride which is formed and recovering the corresponding carboxylic acid.

10. Process according to claim 1 which comprises esterifying the carboxylic acid formed with an alcohol.

11. A member selected from the group of carboxylic acid anhydrides having the following formulae:

(1)

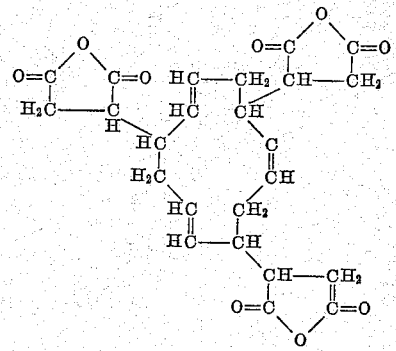

and (2)

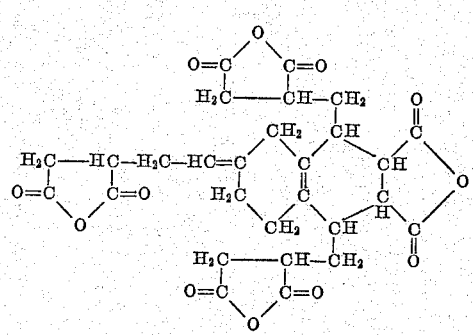

References Cited in the file of this patent

Doolittle: "The Technology of Solvents and Plasticizers," pages 862–8 (1954).

Buttrey: "Plasticizers" (second edition, 1957), page 8.

Classification Manual, Class 260 (April 1958), pages 1–2.

UNITED STATES PATENT OFFICE
CERTIFICATE OF CORRECTION

Patent No. 3,132,155            May 5, 1964

Günther Wilke et al.

It is hereby certified that error appears in the above numbered patent requiring correction and that the said Letters Patent should read as corrected below.

Column 4, line 69, for "from" read -- for --; column 5, line 34, for "where" read -- wherein --; column 6, lines 5 to 19, the formula should appear as shown below instead of as in the patent:

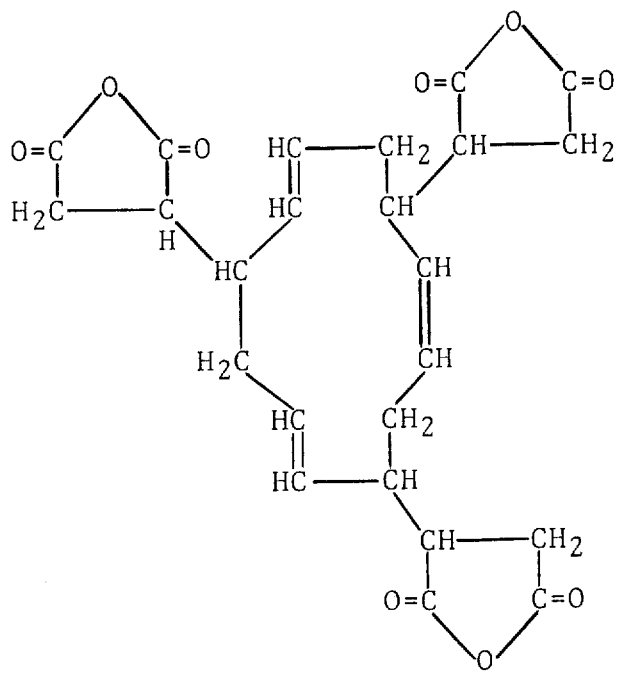

Signed and sealed this 13th day of October 1964.

(SEAL)
Attest:

ERNEST W. SWIDER
Attesting Officer

EDWARD J. BRENNER
Commissioner of Patents